United States Patent Office 3,677,999
Patented July 18, 1972

3,677,999
FLAME-RESISTANT CAST RESIN MOLDING MATERIALS, PARTICULARLY FOR THE PRODUCTION OF NONCOMBUSTIBLE ELECTRICAL COMPONENTS
Hans Denk and Reiner Habrich, Munich, Germany, assignors to Siemens Aktiengesellschaft, Erlangen, Berlin and Munich, Germany
No Drawing. Filed Nov. 3, 1970, Ser. No. 86,589
Claims priority, application Germany, Nov. 5, 1969,
P 19 55 524.9
Int. Cl. C08g 51/04
U.S. Cl. 260—38
4 Claims

ABSTRACT OF THE DISCLOSURE

Flame resistant cast resin molding materials, particularly for manufacture of noncombustible electrical components based on aluminum oxide containing epoxy, polyester, phenol, polyurethane or silicone resin masses. The cast resin molding material contains, for 100 parts by weight of unfilled cast resin mass, 80 to 160 parts by weight of a mixture of $Al_2O_3 \cdot 3H_2O$ and a fine structured fossil. The amount of the fossil is between 6 and 12% by weight of the total amount of filler.

For many voltage conducting electrical components the noncombustible or self extinguishing qualities represents an absolute requirement for their usage.

Thus, for instance, according to VDE Rule 0860H for net operated radio and related electronic apparatus, the high voltage unit of a video device should not, in the sense of this regulation, cause any danger in the vicinity thereof nor constitute any other safety danger.

Such components may neither burn on the outside, following disruptive discharge and following sparks and/or the affect of flames while any occurring flames should be extinguished within 30 seconds (VDE 0860H par. 14.4 and Semko regulation 101 (1966), par. 14.4).

It is known to add flame retarding additions, for example halogen containing resin and/or hardening components such as unsaturated polyester, phenol, epoxy, polyurethane or silicone resin masses. The cast resin masses must contain relatively large amounts of chemically bound halogen to obtain an adequate flame protection effect. This, however, frequently has a detrimental effect upon essential qualities. Adverse effects occur primarily in sensitive electrical components, for example, selenium rectifiers, to be cast. The corrosion damages of adjacent electronic components or of entire units are very bad. These deleterious effects are gaseous hydrogen chloride or hydrogen bromide which occurs by flames upon halogen containing masses.

It is also known to use aluminum oxide trihydrate ($Al_2O_3 \cdot 3H_2O$) as an addition to curb the burning and quench the flames. But even components which are cast with a high addition of $Al_2O_3 \cdot 3H_2O$ may ignite following deformation, at the upper, outer casting edges, since the surface is depleted of flame curbing filler material as a result of sedimentation of the high density $Al_2O_3 \cdot 3H_2O$. By pulling up the liquid case resin components, e.g. by surface tension, almost filler-free zones are formed at the walls of the casting mold.

It is not possible to operate with a larger addition of $Al_2O_3 \cdot 3H_2O$ and/or an addition of known thixotropic agents, so as to prevent sedimentation, for example by adding amorphous silicic acid, as the cast mass will become too viscous at processing temperatures and will not be processable or will only lend itself to processing with great difficulty. The addition of antimony trioxide, which was also recommended for flame curbing action, also is ineffective in this instance.

The invention is based on the objective to develop a cast resin molding material base of epoxide polyester, phenol, polyurethane and silicone cast resin masses, containing aluminum oxide trihydrate which will eliminate the afore-indicated disadvantages and which, in the sense of the VDE regulation 0860H par. 14.4, will constitute a cast resin molding material which will not burn, have dielectric strength of >20 kv., withstand temperature changes, from —20° C. to +90° C., and be easy to work.

The cast resin molding material is so characterized that for 100 parts by weight of unfilled case resin mass, it contains 80 to 160 parts by weight of a mixture of $Al_2O_3 \cdot 3H_2O$ as well as a finely structured fossil, whereas the share of the fossil is between 6 and 12%, relative to the total amount of filler.

A fossil is a plant or animal mineralization. It is characterized by a large surface. The most suitable are the fossils formed of bryozao colonies, such as for example, silica is sold under the name of Sillitin by the firm Franz Hoffmann & Sohne KG, Neuburg-Donau. The particle size of the Sillitin may be up to 20µ and is preferably within the range of 0.5 to 3µ.

The fine structure of the fossil is a loosened heap of debris and provides advantages during processing which are not found in either a leafy structure or a granular build up. It is particularly easy to mix without causing too much thixotropy to the cast resin mass, is not inclined toward sedimentation and prevents to a particularly high degree, the sedimentation of other fillers, as for example, the flame-curbing $Al_2O_3 \cdot 3H_2O$.

The $Al_2O_3 \cdot 3H_2O$ is present in the form of powder. The main content has a grain size of $<100\mu$. Also, the cast resin molding materials according to the invention, may contain conventional additions, as for example, aging preventive agents and coloring materials.

Particularly preferred in regard to the dielectric and mechanical characteristics are cast resin molding materials, on an epoxy resin base, which were produced by reacting with epoxy compounds containing at least two epoxy groups in molecules and a mixture of a monomeric acid ester and an acid anhydride, as described in U.S. Pat. No. 3,438,909.

The invention is disclosed in greater detail by the following examples:

EXAMPLE 1

100 g. of a bisglycidyl ether on a base of bisphenol-A with an epoxy number of about 0.52, for example araldite CY 205 is produced with 42 g. hexahydrophthalic acid anhydride and 116 g. of the acid ester, through esterification of 1 mol castor oil and commercially available from Ciba AG, Wehr, mixed homogeneously with 3 mol hexahydrophthalic acid anhydride, at 80° C. Into this mixture are admixed 375 g. $Al_2O_3 \cdot 3H_2O$ and 25 g. of a fine structured fossil (Sillitin Z), which is commercially available from Franz Hoffmann and Sohne, Neuburg-Donau. The mixture is degassed at 80° C. and approximately 1 torr, under slow rotation for about 15 minutes. After adding and distributing homogeneously, 0.4 g. 2,4,6-tri-(dimethylaminoethyl)-phenol, as a reaction accelerator, the cast resin mass is ready for casting.

Color television multiplying cascades are cast with this mass, at 80° C. and hardened at 80° C. for 16 hours, in a circulating air furnace and formed thereafter. The cascades are non-flammable according to VDE 0860 H.

To prove their resistance to temperature changes, they are subjected to a test. To this end, the cascades are exposed to a repeated temperature change of +90° C. to —20° C. After five passages through this temperature loop, the cast cascades showed neither tears nor cracks. They are impeccable electrically and high voltage stable (>20 kv.)

The fireproof cast resin molding materials may be used everywhere where non-inflammability is required, especially in the field of electrical industry. This cast resin mass is used to particular advantage during the embedding and casting of high voltage conducting components and structural groups, as for example, in color television multiplying cascades, amplification tubes and current supply structural groups.

EXAMPLE 2

A mixture of 100 g. of bisglycidyl ether of bisphenol A with an epoxy number of approximately 0.56, which is commercially available, for example as DER 332 from Dow Chemical, Frankfurt or My 790 from Ciba AG, Wehr, 150 g. $Al_2O_3 \cdot 3H_2O$
10 g. Sillitin Z 3 g. 2,4,6-tri-(dimethylaminomethyl)-phenol is processed under the conditions indicated in Example 1 and hardened for 6 hours, at 80° C.

EXAMPLE 3

One operates according to Example 1, but using 125 g. of a cycloaliphatic epoxy resin with an epoxy number of about 0.53, such as Araldit CY 180, 100 g. hexahydrophtalic acid anhydride
320 g. $Al_2O_3 \cdot 3H_2O$
40 g. Sillitin Z
15 g. of accelerator such as that available from the firm Ciba AG, Wehr.

The hardening is effected through a 24 hour heating to 80° C. and 10 hours heating to 120° C.

EXAMPLE 4

30 g. of a polyurethane resin, commercially available as Dobekan casting resin 1699, from Fa. Dr. Beck & Co., Hamburg, 40 g. of prepolymer isocyanate, available as hardener 1705, from Fa. Dr. Beck & Co., Hamburg,
35 g. unsaturated polyester, available as accelerator 26, from Fa. Dr. Beck & Co., Hamburg,
106 g. $Al_2O_3 \cdot 3H_2O$
7 g. Sillitin Z are mixed at room temperature, degassed and cast. The mixture is hardened for four hours at room temperature and for four hours at 80° C.

EXAMPLE 5

At room temperature were mixed, degassed and cast, e.g., 100 g. silicone resin such as RTV 615 A, available from General Electric, Klockner Chemie, Duisburg,
10 g. hardener such as RTV 615 B, available from General Electric, Klockner Chemie, Duisburg,
85 g. $Al_2O_3 \cdot 3H_2O$
6 g. Sillitin Z The hardening took place by heating for ten hours at 60° C.

The processing is simple and economical in each case. Molded bodies with excellent qualities are obtained also with cast resin molding materials, according to Examples 2-5. The bodies possess good dielectric characteristics, e.g. voltage resistance up to 30 kv., low water absorbancy, extremely small changes in qualities under the affect of heat and high stability against shock-type temperature changes.

We claim:

1. Flame resistant cast resin molding materials based on aluminum oxide containing epoxy, polyester, phenol, polyurethane or silicone resin masses, said cast resin molding material containing for 100 parts by weight of unfilled cast resin mass, 80 to 160 parts by weight of a mixture of $Al_2O_3 \cdot 3H_2O$ and a fine structured silica fossil, with a particle size up to $20\mu$, the share of said fossil being between 6 and 12% by weight of the total amount of filler.

2. The flame resistant casting material of claim 1, wherein fossil material is formed material in fossilized Bryozoa colonies.

3. The flame resistant material of claim 1, wherein the particle sizes of the fossils are from 0.5 to $3\mu$.

4. The flame resistant material of claim 3, which contains as a resin mass formed of an epoxy monomer, at least two groups in the molecule with a mixture of a monomeric acid ester and an acid anhydride.

References Cited

UNITED STATES PATENTS

| 3,202,947 | 8/1965 | Budovec | 260—38 EP X |
| 2,940,942 | 6/1960 | Hodnefield | 260—DIG 24 |
| 2,536,978 | 1/1951 | Fordemwalt | 260—DIG 24 |

LEWIS T. JACOBS, Primary Examiner

U.S. Cl. X.R.

260—37 N, 37 SB, 37 EP, 40 R, DIG 24